US011874683B1

(12) United States Patent
Morin et al.

(10) Patent No.: US 11,874,683 B1
(45) Date of Patent: Jan. 16, 2024

(54) HAND CONTROLLER

(71) Applicant: United States of America as represented by the Administrator of National Aeronautics and Space Administration, Washington, DC (US)

(72) Inventors: Lee M. Morin, Houston, TX (US); Chad A. Shultz, Houston, TX (US)

( * ) Notice: Subject to any disclaimer, the term of this patent is extended or adjusted under 35 U.S.C. 154(b) by 8 days.

(21) Appl. No.: 18/051,290

(22) Filed: Oct. 31, 2022

Related U.S. Application Data

(60) Provisional application No. 63/263,539, filed on Nov. 4, 2021.

(51) Int. Cl.
*G05G 1/04* (2006.01)
*G05G 5/03* (2008.04)

(52) U.S. Cl.
CPC ................. *G05G 1/04* (2013.01); *G05G 5/03* (2013.01)

(58) Field of Classification Search
None
See application file for complete search history.

(56) References Cited

U.S. PATENT DOCUMENTS 3,438,316 A * 4/1969 Rodier ..................... G03B 9/08 396/510
3,790,002 A 2/1974 Germond et al.
4,030,617 A 6/1977 Richter
4,078,670 A 3/1978 Francois et al.
4,298,308 A 11/1981 Richter
4,650,388 A 3/1987 Frioux et al.
4,664,344 A 5/1987 Harwell et al.
4,706,004 A 11/1987 Komatsu et al.
4,750,769 A 6/1988 Tebb
(Continued)

FOREIGN PATENT DOCUMENTS

WO 95/04959 A1 2/1995
WO 99/50721 A1 10/1999

OTHER PUBLICATIONS

Alexander Owen-Hill, "Task-Based Telemanipulation for Maintenance in Large Scientific Facilties", Universidad Politecnica De Madrid, Escuela Tecnica Superior De Ingenieros Industriales, 2014, 243 pages.
(Continued)

*Primary Examiner* — Vicky A Johnson
(74) *Attorney, Agent, or Firm* — David G. Matthews; Edward K. Fein

(57) ABSTRACT

A scissor assembly includes a scissor apparatus having a first scissor jaw and a second scissor jaw that are coupled together. The first scissor jaw has a first jaw face, and the second scissor jaw has a second jaw face that opposes the first jaw face. The scissor apparatus is configured to actuate between a closed position and a plurality of open positions. The scissor assembly includes a pivot pin extending through the first and second scissor jaws. The first and second jaws are configured to rotate around the pivot pin as the scissor apparatus actuates between the closed position and the open positions. The scissor assembly includes a dynamic pin positioned between the first jaw face and the second jaw face. The scissor assembly includes a biasing member positioned at least partially around the scissor apparatus and configured to bias the scissor apparatus toward the closed position.

20 Claims, 7 Drawing Sheets

(56) References Cited

U.S. PATENT DOCUMENTS

| | | | |
|---|---|---|---|
| 4,766,775 | A | 8/1988 | Hodge |
| 5,142,931 | A | 9/1992 | Menahem |
| 5,900,710 | A | 5/1999 | Gautier et al. |
| 6,377,011 | B1 | 4/2002 | Ben-Ur |
| 6,435,794 | B1 | 8/2002 | Springer |
| 8,444,631 | B2 | 5/2013 | Yeung et al. |
| 9,217,389 | B1 * | 12/2015 | Lee ........................... F16K 3/03 |
| 9,333,041 | B2 | 5/2016 | Yeung et al. |
| 9,339,935 | B2 | 5/2016 | Ravindran et al. |
| 9,568,111 | B2 * | 2/2017 | Daniels ................. F16K 3/0227 |
| 10,921,904 | B2 | 2/2021 | Parazynski et al. |

OTHER PUBLICATIONS

Kenneth A. Lillie, Capt, USAF, "Building an Educational Robot Arm for Under $1,000", Dean of the Faculty, United States Air Force Academy, Final Report, Feb. 1992, 22 pages.

Seungnam Yu et al., "Design of a gripper system for tendon-driven telemanipulators considering semi-automatic spring mechanism and eye-in-hand camera system", Journal of Mechanical Science and Technology, 31 (3), 2017, pp. 1437-1446.

* cited by examiner

HAND CONTROLLER

CROSS-REFERENCE TO RELATED APPLICATIONS

This patent application claims priority to U.S. Provisional Patent Application No. 63/263,539, filed on Nov. 4, 2021, the entirety of which is incorporated by reference herein.

STATEMENT OF GOVERNMENT INTEREST

The invention described herein was made by employee(s) of the United States Government and may be manufactured and used by or for the Government of the United States of America for governmental purposes without the payment of any royalties thereon or therefor.

BACKGROUND

Physical hand controllers (PHCs), such as translational hand controllers (THCs) and rotational hand controllers (RHCs), may be used to control a target having one or more degrees of freedom in a physical or virtual environment. One conventional hand controller is a scissor-like mechanism. The scissor-like mechanism may include a control member that is movable in one or more degrees of freedom between a neutral position and a plurality of deflection positions.

The scissor-like mechanism further includes a pair of scissor components formed by a first scissor component and a second scissor component. Each scissor component includes a handle portion and a blade portion. A pivot device is disposed between the handle portions and the blade portions of the pair of scissor components to pivotally couple the pair of scissor components. A spring is coupled at each end to one of the handle portions so that the spring extends between the handle portions. The blade portions may be biased by the spring in a neutral position where the blade portions are engaged against a static pin and a dynamic pin disposed between the blade portions. The handle portions pivot about the pivot device, and are restrained with the spring to hold the blade portions against the static pin and the dynamic pin.

A deflection of the hand controller causes one of the pins to be deflected, which separates the handle portions and engages the spring. The restoring force of the spring causes the hand controller to return to the neutral position when the hand controller is released. A plurality of scissor-like mechanisms may be coupled to the hand controller.

SUMMARY

A scissor assembly is disclosed. The scissor assembly includes a scissor apparatus having a first scissor jaw and a second scissor jaw that are coupled together. The first scissor jaw has a first jaw face, and the second scissor jaw has a second jaw face that opposes the first jaw face. The scissor apparatus is configured to actuate between a closed position and a plurality of open positions including at least a first open position and a second open position. The scissor assembly also includes a pivot pin extending through the first and second scissor jaws. The first and second jaws are configured to rotate around the pivot pin as the scissor apparatus actuates between the closed position and the open positions. The scissor assembly also includes a dynamic pin positioned between the first jaw face and the second jaw face. The dynamic pin is configured to push against the first jaw face such that the dynamic pin and the first scissor jaw move to actuate the scissor apparatus into the first open position. The dynamic pin is configured to push against the second jaw face such that the dynamic pin and the second scissor jaw move to actuate the scissor apparatus into the second open position. The scissor assembly also includes a biasing member positioned at least partially around the scissor apparatus and configured to bias the scissor apparatus toward the closed position.

A hand controller is also disclosed. The hand controller includes a control member movable in at least one degree of freedom between a neutral position and a plurality of deflection positions including at least a first deflection position and a second deflection position. The hand controller also includes a scissor assembly coupled to the control member. The scissor assembly includes a scissor apparatus having a first scissor jaw and a second scissor jaw that are coupled together. The first scissor jaw has a first jaw face, and the second scissor jaw has a second jaw face that opposes the first jaw face. The scissor apparatus is configured to actuate between a closed position and a plurality of open positions including at least a first open position and a second open position. The scissor assembly also includes a pivot pin extending through the first and second scissor jaws. The first and second jaws are configured to rotate around the pivot pin as the scissor apparatus actuates between the closed position and the open positions. The scissor assembly also includes a dynamic pin positioned between the first jaw face and the second jaw face. The dynamic pin is configured to push against the first jaw face such that the dynamic pin and the first scissor jaw move to actuate the scissor apparatus into the first open position in response to the control member moving into the first deflection position. The dynamic pin is configured to push against the second jaw face such that the dynamic pin and the second scissor jaw move to actuate the scissor apparatus into the second open position in response to the control member moving into the second deflection position. The scissor assembly also includes a biasing member positioned at least partially around the scissor apparatus and configured to bias the scissor apparatus toward the closed position.

In another embodiment, the hand controller includes a control member movable in at least one degree of freedom between a neutral position and a plurality of deflection positions including at least a first deflection position and a second deflection position. The hand controller also includes a plurality of scissor spring assemblies coupled to the control member. The scissor assemblies include at least a first scissor spring assembly, a second scissor spring assembly, and a third scissor spring assembly. The first scissor spring assembly is configured to actuate in response to the control member moving in a first dimension. The second scissor spring assembly is configured to actuate in response to the control member moving in a second dimension. The third scissor spring assembly is configured to actuate in response to the control member moving in a third dimension. The first, second, and third dimensions are perpendicular to one another. Each of the first, second, and third scissor spring assemblies includes a scissor apparatus having a first scissor jaw and a second scissor jaw that are coupled together. The first scissor jaw has a first jaw face, and the second scissor jaw has a second jaw face that opposes the first jaw face. The scissor apparatus is configured to actuate between a closed position and a plurality of open positions including at least a first open position and a second open position. A distance between the first and second jaw faces increases as the scissor apparatus actuates from the closed position to the open positions. Each of the first, second, and third scissor spring assemblies also includes a pivot pin extending through the first and second scissor jaws. The first and second jaws are configured to rotate around the pivot pin as the scissor apparatus actuates between the closed position and the open positions. Each of the first, second, and third scissor spring assemblies also includes a dynamic pin positioned between the first jaw face and the second jaw face. The dynamic pin is configured to push against the first jaw face in a first direction such that the dynamic pin and the first scissor jaw move in the first direction to actuate the scissor apparatus into the first open position in response to the control member moving into the first deflection position. The dynamic pin is configured to push against the second jaw face in a second direction such that the dynamic pin and the second scissor jaw move in the second direction to actuate the scissor apparatus into the second open position in response to the control member moving into the second deflection position. The first and second directions are arcuate and opposite of one another. Each of the first, second, and third scissor spring assemblies also includes a static pin positioned at least partially between the first jaw face and the second jaw face. The static pin prevents the second scissor jaw from moving as the scissor apparatus actuates into the first open position. The static pin prevents the first scissor jaw from moving as the scissor apparatus actuates into the second open position. Each of the first, second, and third scissor spring assemblies also includes a biasing member extending around an outer perimeter of the scissor apparatus. The biasing member is configured to provide a bias force that actuates the scissor apparatus into the closed position and moves the control member into the neutral position in response to a user releasing the control member.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein.

DETAILED DESCRIPTION

Figure 1:
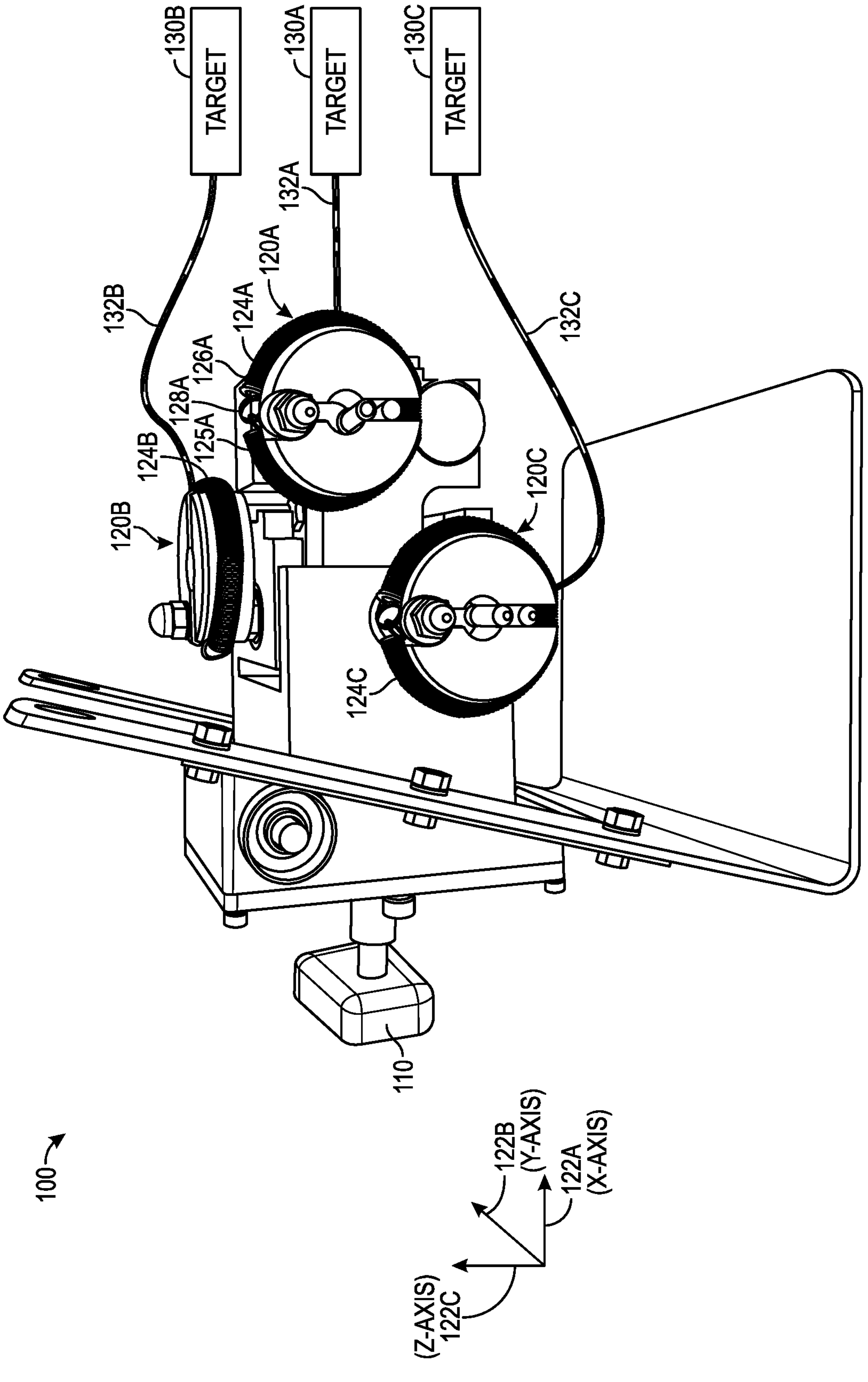
FIG. 1 illustrates a perspective view of a hand controller including one or more (e.g., three) scissor spring assemblies, according to an embodiment.

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art, now having the benefit of this detailed description, that other embodiments may be practiced without these specific details. In other instances, well-known methods, procedures, components, circuits, and networks have not been described in detail so as to assist in understanding aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The system and method disclosed herein include a physical hand controller (PHC), such as a translational hand controller (THC) and/or a rotational hand controller (RHC). In one embodiment, the hand controller may be used on and/or in a vehicle. The vehicle may be or include a car, truck, train, boat, helicopter, unmanned aerial vehicle (e.g., a drone), an airplane, a spacecraft, a satellite, or the like. In one embodiment, the hand controller may be used in a vacuum environment and/or a low-gravity or no-gravity environment (e.g., outside of the Earth's atmosphere). The hand controller may be used to control one or more targets (e.g., on and/or in the vehicle). In one embodiment, the target(s) may be the vehicle (i.e., the hand controller may navigate the movement of the vehicle). In another embodiment, the target(s) may be or include one or more components in and/or on the vehicle, such as a robotic arm or a mechanical actuator mechanism. In yet another embodiment, the targets may also or instead guide a remote vehicle, a remote manipulator, an excavator, or the like.

FIG. 1 illustrates a perspective view of a hand controller 100, according to an embodiment. The hand controller 100 may include an input member (also referred to as a control member) 110 and one or more output members (also referred to as scissor assemblies or scissor spring assemblies) 120A-120C. The control member 110 may be coupled to the scissor spring assemblies 120A-120C. The control member 110 may be configured to be moved in one or more dimensions. For example, the control member 110 may be moved by a user or a computing system in three dimensions. The control member 110 may be moved through and/or positioned in multiple degrees of freedom (e.g., in each dimension).

The control member 110 may be moved in a first dimension 122A (e.g., in and out) from a first position to one or more second positions, which actuates (e.g., rotates) a first of the scissor spring assemblies 120A from a first (e.g., closed) position to one or more second (e.g., open) positions. Similarly, the control member 110 may be moved in a second dimension 122B (e.g., left and right) from a first (e.g., neutral) position to one or more second (e.g., deflected) positions, which actuates (e.g., rotates) a second of the scissor spring assemblies 120B from a first (e.g., closed) position to one or more second (e.g., open) positions. Similarly, the control member 110 may be moved in a third dimension 122C (e.g., up and down) from a first (e.g., neutral) position to one or more second (e.g., deflected) positions, which actuates (e.g., rotates) a third of the scissor spring assemblies 120C from a first (e.g., closed) position to one or more second (e.g., open) positions. The control member 110 may be moved in two or more dimensions simultaneously, allowing two or three of the scissor spring assemblies 120A-120C to be actuated simultaneously.

Each scissor spring assembly 120A-120C may include a biasing member 124A-124C coupled thereto. The biasing members 124A-124C may be or include springs, elastic bands, etc. The biasing members (see biasing member 124A) may include first and second axial ends 125A, 126A that may be coupled together using a coupling mechanism 128A. This may facilitate wrapping the biasing members 124A-124C around the outer perimeters of the scissor spring assemblies 120A-120C, as described in greater detail below.

The biasing members 124A-124C may apply a (e.g., rotational) force to bias scissor spring assemblies 120A-120C toward/into the closed position, and thus the control member 110 from the deflected position back to the neutral position. Positioning the (e.g., circumferential) biasing members 124A-124C at/around the exterior (e.g., circular) perimeter of the scissor spring assemblies 120A-120C allows for the biasing members 124A-124C to be more easily removed and/or replaced when compared to the linear springs used in conventional scissor-like mechanisms. Thus, replacement biasing members 124A-124C having different sizes and/or expansion/contraction forces may be selected to tune the deflection forces of the scissor spring assemblies 120A-120C depending upon the application. The ability to vary the size and/or force of the biasing members 124A-124C may also help to adjust the speed at which the scissor spring assemblies 120A-120C return to the closed position and/or the control member 110 returns to the neutral position.

In addition, the (e.g., circumferential) biasing members 124A-124C may be longer than the linear springs used in conventional scissor-like mechanisms. Thus, for a given distance of deflection, the proportion of expansion may be smaller for the biasing members 124A-124C when compared to the linear springs used in conventional scissor-like mechanisms. As a result, the deflection forces for the biasing members 124A-124C may remain on a more linear portion of the force deflection curve than the deflection forces for the springs used in conventional scissor-like mechanisms, which may be on a more non-linear (e.g., exponential) portion of the force deflection curve. The biasing members 124A-124C may thus experience less wear and tear than the springs used in conventional scissor-like mechanisms.

The hand controller 100 may also include one or more wires 132A-132C. The wires 132A-132C may be connected to and/or positioned between the scissor spring assemblies 120A-120C and one or more targets (three are shown: 130A-130C). In one embodiment, the (e.g., mechanical) movement of the scissor spring assemblies 120A-120C may be converted into electrical signals that are transmitted through the wires 132A-132C to the targets 130A-130C. The electrical signals may cause the targets 130A-130C to move. For example, the electrical signals may be converted back into (e.g., mechanical) movement of the targets 130A-130C. In another embodiment, the wires 132A-132C may be omitted, and the signals may be transmitted to the targets 130A-130C wirelessly. In yet another embodiment, a mechanical linkage may transfer the movement of the scissor spring assemblies 120A-120C to the targets 130A-130C. Although three targets 130A-130C are shown, in another embodiment, the scissor spring assemblies 120A-120C and wires 132A-132C (or mechanical linkages) may instead control a single target (e.g., target 130A) in three dimensions.

Figure 2:
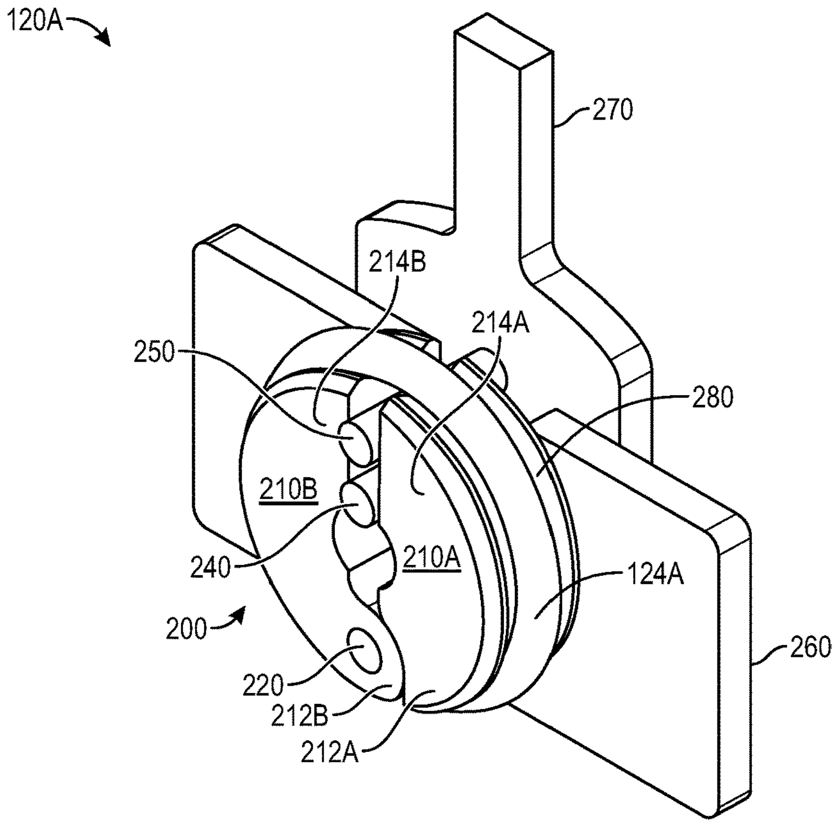
FIG. 2 illustrates a perspective view of a first of the scissor spring assemblies in a first (e.g., closed) position, according to an embodiment.
Figure 3:
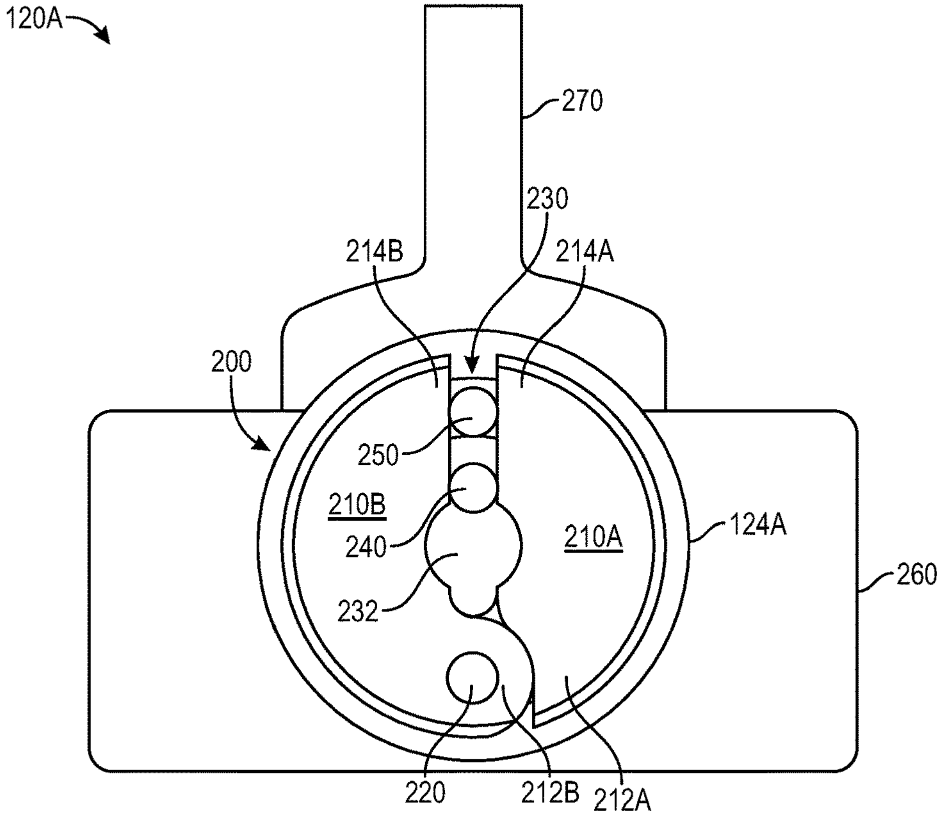
FIG. 3 illustrates a front view of the first scissor spring assembly in the first (e.g., closed) position, according to an embodiment.

FIGS. 2 and 3 illustrate a perspective view and a front view of the first scissor spring assembly 120A in a first (e.g., closed) position, according to an embodiment. The second and/or third scissor spring assemblies 120B, 120C may be the same as, or different from, the first scissor spring assembly 120A. In one embodiment, when the second and/or third scissor spring assemblies 120B, 120C are different, they may have a different size (e.g., diameter) and/or a biasing member 124B, 124C with a different deflection force.

The scissor spring assembly 120A may include a scissor apparatus 200 having a first scissor jaw 210A and a second scissor jaw 210B that are coupled together. The first and second scissor jaws 210A, 210B may each have a partially circular shape such that the scissor apparatus 200 is substantially circular (e.g., when the scissor spring assembly 120A and/or scissor apparatus is in the closed position).

The first and second jaws 210A, 210B may each include a first circumferential end (also referred to as a pivot end) 212A, 212B and a second circumferential end (also referred to as an opening end) 214A, 214B. A first pin (also referred to as a pivot pin) 220 may extend through the pivot ends 212A, 212B. The first and second jaws 210A, 210B may be configured to rotate with respect to one another around the pivot pin 220. More particularly, a distance between the opening ends 214A, 214B may increase as the scissor apparatus 200 actuates from the closed position to the open position, and the distance between the opening ends 214A, 214B may decrease as the scissor apparatus 200 actuates from the open position to the closed position.

A slot (also referred to as a circumferential gap) 230 may extend from a middle portion 232 of the scissor apparatus 200 to an outer portion of the scissor apparatus 200. The slot 230 may be at least partially defined by the opening ends 214A, 214B of the first and second scissor jaws 210A, 210B. A second pin (also referred to as a static pin) 240 and/or a third pin (also referred to as a dynamic pin) 250 may be positioned at least partially within the slot 230. The static pin 240 may be stationary with respect to the pivot pin 220. The dynamic pin 250 may be configured to move with respect to the pivot pin 220 and/or the static pin 240. As described in greater detail below, the dynamic pin 250 may be configured to move in response to movement of the control member 110.

In one embodiment, the hand controller 100 may also include a first plate (also referred to as a static plate) 260 and a second plate (also referred to as a dynamic plate) 270. The static plate 260 may be coupled to the pivot pin 220 and/or the static pin 240. The dynamic plate 270 may be coupled to the control member 110 and/or the dynamic pin 250. The dynamic pin 250 may extend through an opening in the static plate 260. The control member 110, the dynamic pin 250, and/or the dynamic plate 270 may be configured to move with respect to the static pin 240 and/or the static plate 260.

An outer surface of the first and second scissor jaws 210A, 210B may include a circumferential groove 280 in which the biasing member (e.g., a spring) 124A may be positioned. As mentioned above, the biasing member 124A may expand as the scissor spring assembly 120A actuates into the open position, and may contract as the scissor spring assembly 120A actuates into the closed position. The biasing member 124A may exert a force on the first and second scissor jaws 210A, 210B that biases the scissor spring assembly 120A toward the closed position.

Figure 4:
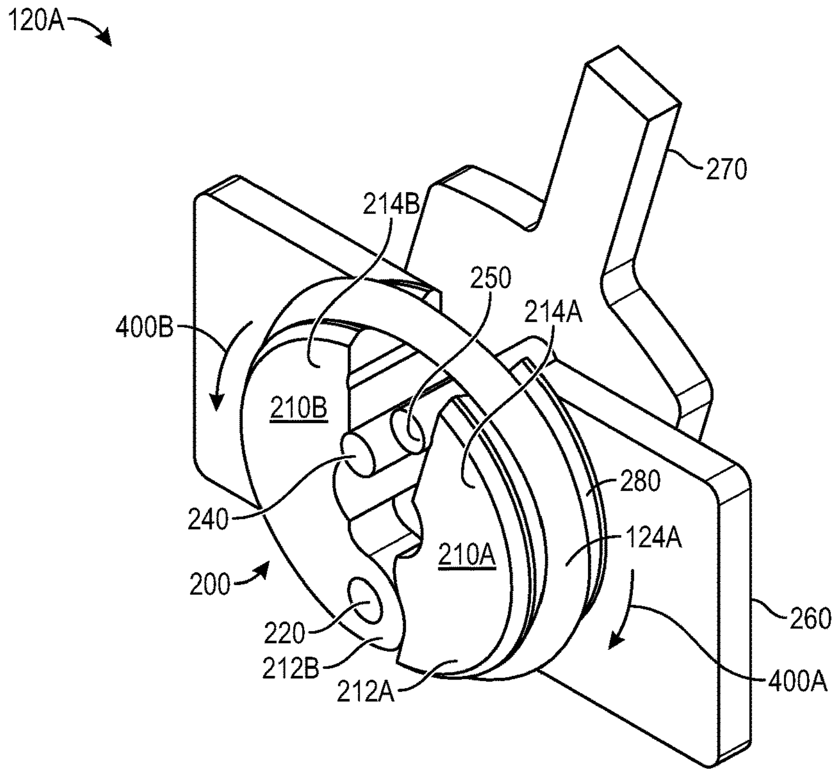
FIG. 4 illustrates a perspective view of the first scissor spring assembly in a second (e.g., open) position, according to an embodiment.
Figure 5:
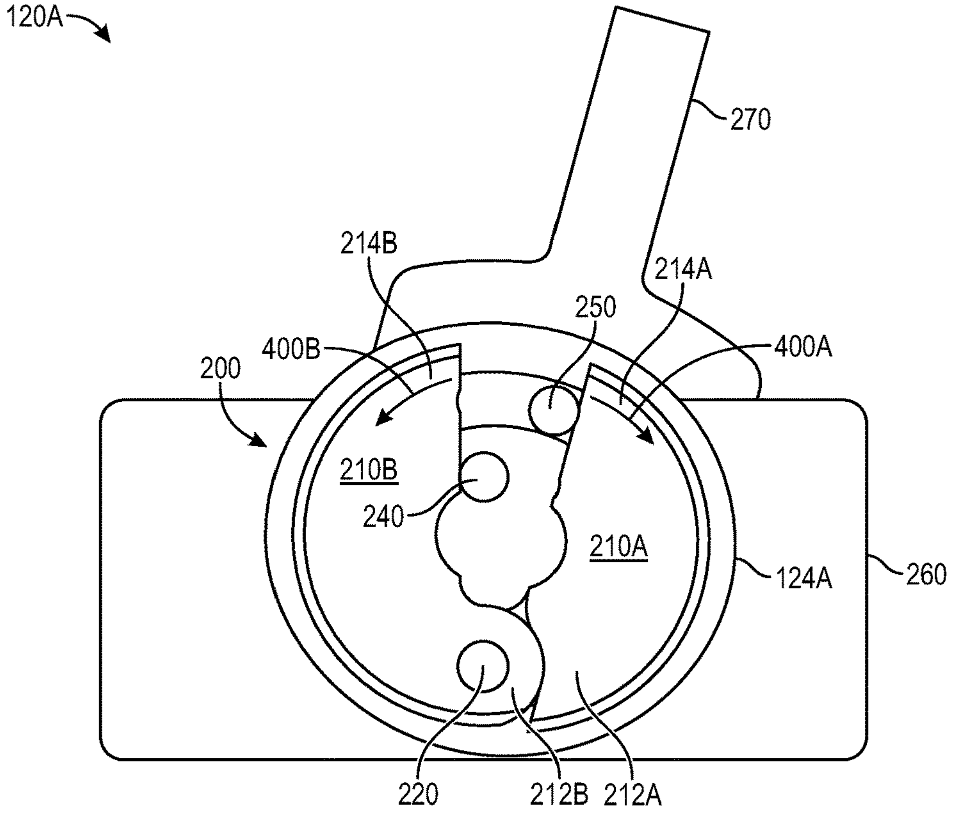
FIG. 5 illustrates a front view of the first scissor spring assembly in the second (e.g., open) position, according to an embodiment.

FIGS. 4 and 5 illustrate a perspective view and a front view of the first scissor spring assembly 120A in a second (e.g., open) position, according to an embodiment. In the example described above with respect to FIG. 1, the control member 110 may be moved in a first dimension 122A (e.g., in and out) from a first position to one of the second positions, which actuates (e.g., rotates) the scissor spring assembly 120A from the first (e.g., closed) position to one of the second (e.g., open) positions.

Continuing with this example, the control member 110 being moved in a first direction in the dimension 122A (e.g., the control member 110 being pushed in) may cause the dynamic pin 250 to move in a first direction 400A. The first direction 400A of the dynamic pin 250 may be linear or arcuate. The dynamic pin 250 moving in the first direction 400A may exert a force on the opening end 214A of the first scissor jaw 210A in the first direction 400A. This may cause the first scissor jaw 210A to move (e.g., rotate) around the pivot pin 220 and increase the distance between the opening ends 214A, 214B. The second scissor jaw 210B and the static pin 240 may remain stationary. More particularly, the static pin 240 may prevent the second scissor jaw 210B from moving in the first direction 400A.

Although not shown, the control member 110 being moved in a second direction in the dimension 122A (e.g., the control member 110 being pulled out) may cause the dynamic pin 250 to move in a second (e.g., opposite) direction 400B. The second direction 400B of the dynamic pin 250 may be linear or arcuate. The dynamic pin 250 moving in the second direction 400B may exert a force on the opening end 214B of the second scissor jaw 210B in the second direction 400B. This may cause the second scissor jaw 210B to move (e.g., rotate) around the pivot pin 220 and increase the distance between the opening ends 214A, 214B. The first scissor jaw 210A and the static pin 240 may remain stationary. More particularly, the static pin 240 may prevent the first scissor jaw 210A from moving in the second direction 400B.

As mentioned above, the biasing member (e.g., a spring) 124A may expand as the distance between the scissor jaws 210A, 210B increases. As the biasing member 124A expands, the bias force exerted by the biasing member 124A to push the scissor jaws 210A, 210B back together may increase. Thus, once the control member 110 is released, the biasing member 124A may push the jaws 210A, 210B back together (i.e., closing the scissor spring assembly 120A and/or scissor apparatus 200), which moves the control member 110 back into the neutral position.

In one embodiment, an amount of movement of the control member 110 may control an amount of movement of the dynamic pin 250 and/or the first scissor jaw 210A (or second scissor jaw 210B). Thus, moving the control member 110 a small distance may cause the dynamic pin 250 and/or the first scissor jaw 210A (or second scissor jaw 210B) to move a small distance. Similarly, moving the control member 110 a larger distance may cause the dynamic pin 250 and/or the first scissor jaw 210A (or second scissor jaw 210B) to move a larger distance. As a result, the scissor spring assembly 120A (and/or the scissor apparatus 200) may be configured to actuate into a plurality of different open positions depending upon the direction and/or distance moved.

As described above, the target(s) 130A-130C may move in response to the movement of the scissor spring assembly 120A. Thus, moving the scissor spring assembly 120A in the first (e.g., clockwise) direction 400A may cause the target 130A to move in a first direction, and moving the scissor spring assembly 120A in the second (e.g., counterclockwise) direction 400B may cause the target 130A to move in a second direction. The first direction of the target 130A may be the same as or different form the first direction 400A of the scissor spring assembly 120A, and the second direction of the target 130A may be the same as or different form the second direction 400B of the scissor spring assembly 120A. In addition, moving the scissor spring assembly 120A a small distance may cause the target 130A to move a small distance, and moving the scissor spring assembly 120A a larger distance may cause the target 130A to move a larger distance.

Figure 6:
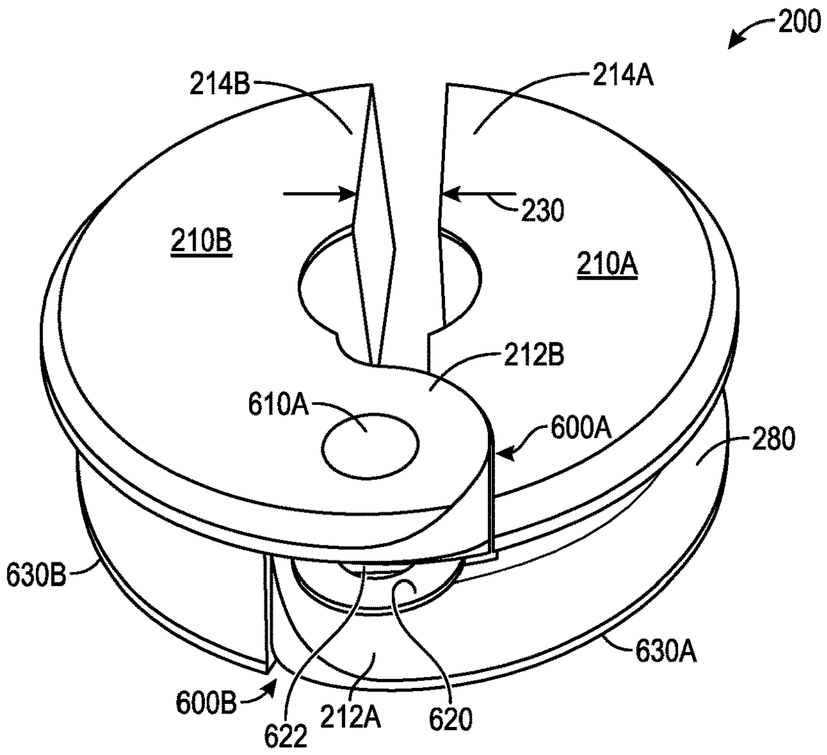
FIG. 6 illustrates a perspective view of the first scissor spring assembly, according to an embodiment.
Figure 7:
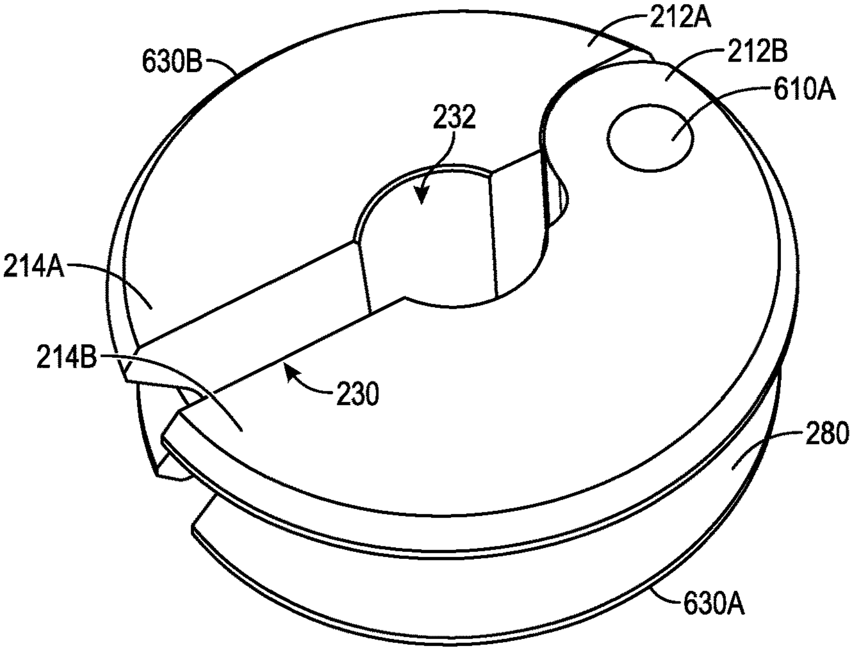
FIG. 7 illustrates a perspective view of the first scissor spring assembly flipped upside-down, according to an embodiment.

FIG. 6 illustrates a perspective view of the scissor apparatus 200 in the first scissor spring assembly 120A, and FIG. 7 illustrates a perspective view of the scissor apparatus 200 flipped upside-down, according to an embodiment. The first scissor jaw 210A may define a circumferential recess 600A that is configured to receive the pivot end 212B of the second scissor jaw 210B. Similarly, the second scissor jaw 210B may define a circumferential recess 600B that is configured to receive the pivot end 212A of the first scissor jaw 210A. In addition, the pivot ends 212A, 212B may be axially offset from one another and/or at least partially circumferentially overlap with one another such that openings 610A, 610B for the pivot pin 220 may be aligned.

In one embodiment, a washer 620 may be positioned at least partially (e.g., axially) between the pivot ends 212A, 212B. An opening 622 through the washer 620 may be aligned with the openings 610A, 610B in the pivot ends 212A, 212B. Thus, the pivot pin 220 may extend through the openings 610A, 610B in the pivot ends 212A, 212B and the opening 622 in the washer 620. The washer 620 may protrude (e.g., radially) into the groove 280 and/or outward farther than outer surfaces 630A, 630B of the scissor jaws 210A, 210B. The washer 620 may help to secure the biasing member 124A in place. For example, the washer 620 may prevent the biasing member 124A from slipping, rotating, and/or dislodging during actuation of the scissor spring assembly 120A. In one embodiment, the washer 620 may be adjacent to, in contact with, and/or coupled to the ends 125A, 126A of the biasing member 124A and/or the coupling mechanism 128A. In another embodiment, the washer 620 may be positioned circumferentially between two adjacent coils of the biasing member 124A (e.g., a spring).

Figure 8:
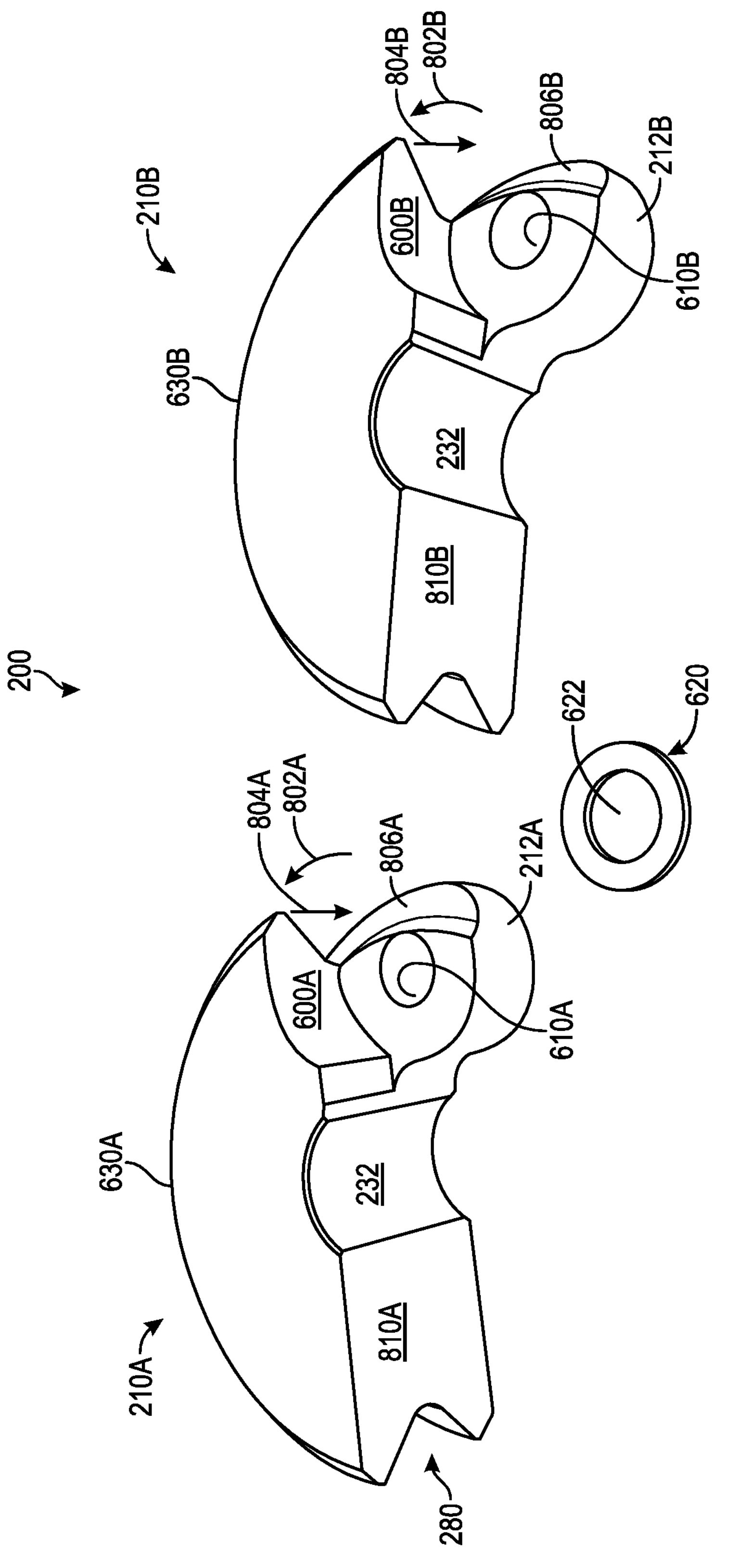
FIG. 8 illustrates an exploded perspective view of the first scissor spring assembly with first and second scissor jaws, according to an embodiment.
Figure 9:
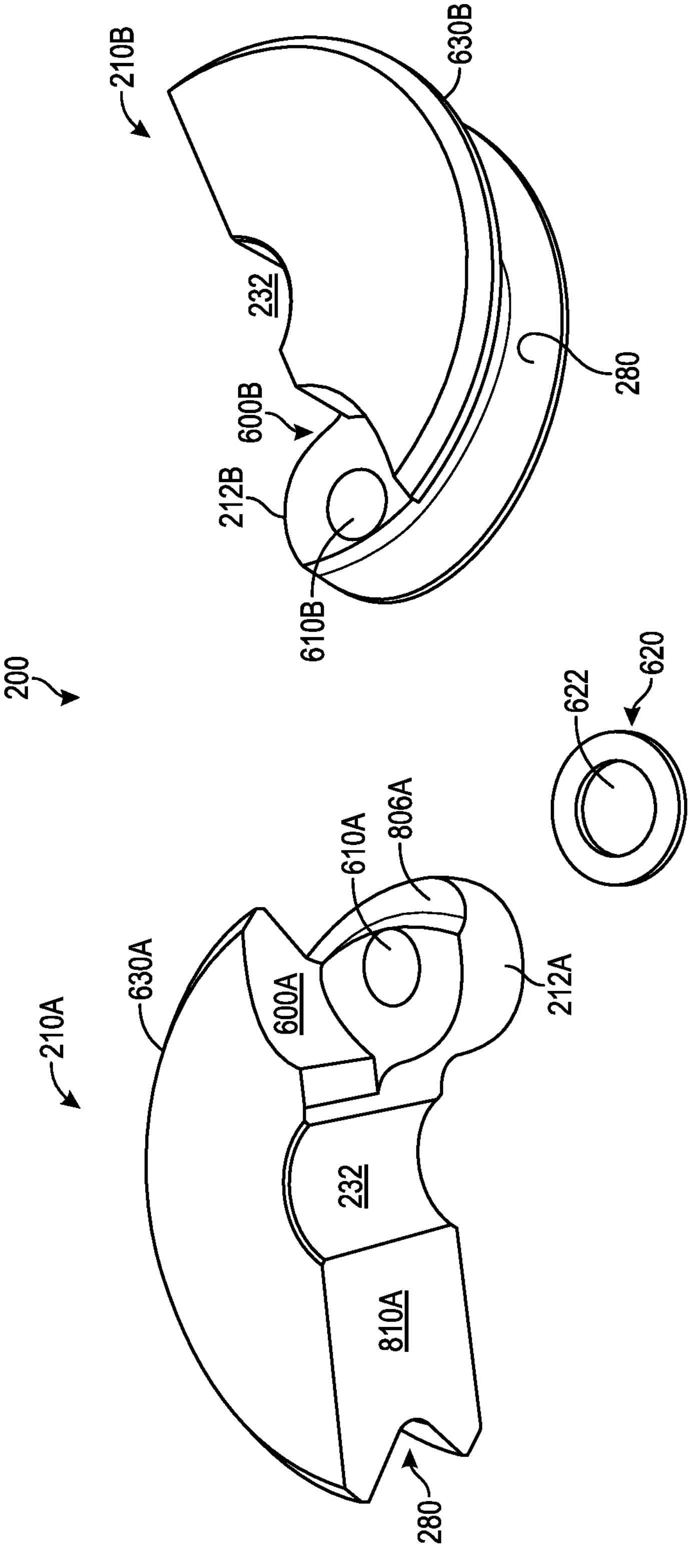
FIG. 9 illustrates an exploded perspective view of the first scissor spring assembly with the second scissor jaw flipped upside-down, according to an embodiment.

FIG. 8 illustrates an exploded perspective view of the first and second scissor jaws 210A, 210B, and FIG. 9 illustrates an exploded perspective view of the first and second scissor jaws 210A, 210B with the second scissor jaw 210B flipped upside-down, according to an embodiment. The recesses 600A, 600B described above may extend in a circumferential direction 802A, 802B and/or an axial direction 804A, 804B. In one embodiment, the pivot ends 212A, 212B may include a tapered surface 806A, 806B such that an axial thickness decreases proceeding radially outward from the openings 610A, 610B toward the outer surfaces 630A, 630B. This may provide clearance for the sides of the circumferential biasing member(s)124A-124C so that they do not bind.

The first and second scissor jaws 210A, 210B may each also include or define jaw faces 810A, 810B. The jaw faces 810A, 810B may face one another and extend from the middle portion 232 of the jaws 210A, 210B to the outer surfaces jaw faces 810A, 810B in a direction that is away from the pivot ends 212A, 212B. The jaw faces 810A, 810B may at least partially define the slot 230. The jaw faces 810A, 810B may move away from one another as the first scissor spring assembly 120A actuates into the open position, and may move toward one another as the first scissor spring assembly 120A actuates into the closed position.

Figure 10:
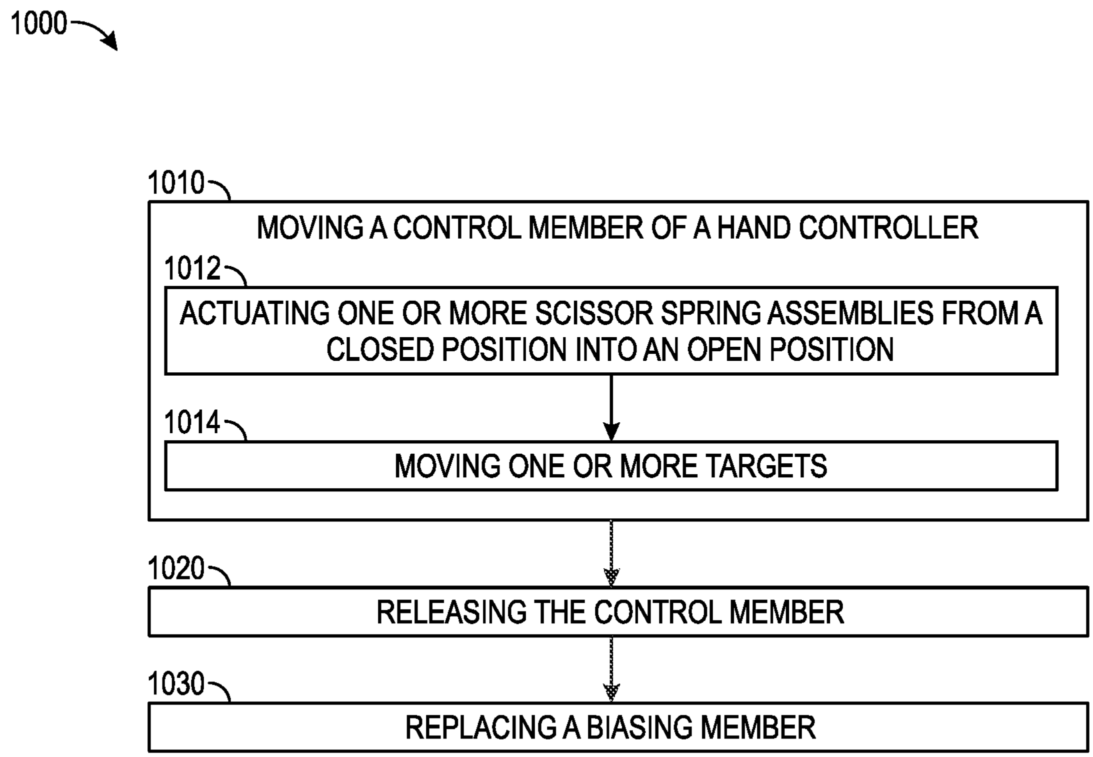
FIG. 10 illustrates a flowchart of a method for operating the hand controller, according to an embodiment.

FIG. 10 illustrates a flowchart of a method 1000 for operating the hand controller 100, according to an embodiment. An illustrative order of the method 1000 is provided below; however, one or more steps of the method 1000 may be performed in a different order, combined, repeated, or omitted.

The method 1000 may include moving the control member 110, as at 1010. The control member 110 may be moved by a user (e.g., a person) or by a computing system. The control member 110 may be moved in one dimension, two dimensions, or three dimensions from the neutral position to one or more deflected positions. The control member 110 may be moved into and/or through a plurality of degrees of freedom from the neutral position to one or more deflected positions.

Moving the control member 110 may cause one or more of the scissor spring assemblies 120A-120C to actuate from a closed position into an open position, as at 1012. The direction (e.g., clockwise and/or counterclockwise) that each scissor spring assembly 120A-120C actuates may depend at least partially upon the direction of movement of the control member 110. For example, the first scissor spring assembly 120A may have the first scissor jaw 210A move, and the second and third scissor spring assemblies 120B, 120C may have the second scissor jaws move. The distance that each scissor spring assembly 120A-120C actuates may also depend at least partially upon the amount of movement of the control member 110. For example, the first scissor jaw 210A in the first scissor spring assembly 120A may move a greater distance than the second scissor jaws of the second and third scissor spring assemblies 120B, 120C.

Moving the control member 110 may also cause one or more targets 130A-130C to move, as at 1014. In one embodiment, each of the scissor spring assemblies 120A-120C may be coupled to a different target 130A-130C, and the actuation of the scissor spring assemblies 120A-120C may cause the targets to each move (e.g., in one dimension). In another embodiment, there may only be one target (e.g., 130A), and each of the scissor spring assemblies 120A-120C may cause the target 130A to move in a different dimension. As a result, the three scissor spring assemblies 120A-120C may move the target 130A in three dimensions.

The method 1000 may also include releasing the control member 110, as at 1020. Once the control member 110 is released, the biasing members 124A-124C may cause the spring assemblies 120A-120C to actuate from the open positions into the closed positions. This, in turn, may cause the control member 110 to move from the deflected positions to the neutral position.

The method 1000 may also include replacing the biasing member(s) 124A-124C, as at 1030. This may include removing the existing biasing member(s) 124A-124C from the grooves 280. This may also include positioning new/different biasing members 124A-124C in the groove(s) 280 after the old/worn biasing members 124A-124C have been removed. As discussed above, the new biasing members 124A-124C may have different sizes and/or forces.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to explain the principles of the invention and its practical applications, thereby enabling others skilled in the art to utilize the various embodiments with various modifications as are suited to the particular use contemplated.

What is claimed is:

1. A scissor assembly, comprising:

a scissor apparatus comprising a first scissor jaw and a second scissor jaw that are coupled together, wherein the first scissor jaw has a first jaw face, wherein the second scissor jaw has a second jaw face that opposes the first jaw face, and wherein the scissor apparatus is configured to actuate between a closed position and a plurality of open positions including at least a first open position and a second open position;

a pivot pin extending through the first and second scissor jaws, wherein the first and second jaws are configured to rotate around the pivot pin as the scissor apparatus actuates between the closed position and the open positions;

a dynamic pin positioned between the first jaw face and the second jaw face, wherein the dynamic pin is configured to push against the first jaw face such that the dynamic pin and the first scissor jaw move to actuate the scissor apparatus into the first open position, and wherein the dynamic pin is configured to push against the second jaw face such that the dynamic pin and the second scissor jaw move to actuate the scissor apparatus into the second open position; and a biasing member positioned at least partially around the scissor apparatus and configured to bias the scissor apparatus toward the closed position.

2. The scissor assembly of claim 1, wherein the first scissor jaw comprises a first pivot end defining a first opening, wherein the second scissor jaw comprises a second pivot end defining a second opening, wherein the pivot pin extends through the first and second openings, and wherein a circumferential gap is present between the first and second jaw faces when the scissor apparatus is in the closed position, the first open position, and the second open position.

3. The scissor assembly of claim 1, further comprising a static pin positioned at least partially between the first jaw face and the second jaw face, wherein the static pin prevents the second scissor jaw from moving as the scissor apparatus actuates into the first open position, and wherein the static pin prevents the first scissor jaw from moving as the scissor apparatus actuates into the second open position.

4. The scissor assembly of claim 1, wherein an outer surface of the scissor apparatus is substantially circular in the closed position.

5. The scissor assembly of claim 4, wherein the outer surface of the scissor apparatus defines a groove, and wherein the biasing member is positioned at least partially around the scissor apparatus and at least partially in the groove.

6. A hand controller, comprising:

a control member movable in at least one degree of freedom between a neutral position and a plurality of deflection positions including at least a first deflection position and a second deflection position; and a scissor assembly coupled to the control member, wherein the scissor assembly comprises:

a scissor apparatus comprising a first scissor jaw and a second scissor jaw that are coupled together, wherein the first scissor jaw has a first jaw face, wherein the second scissor jaw has a second jaw face that opposes the first jaw face, and wherein the scissor apparatus is configured to actuate between a closed position and a plurality of open positions including at least a first open position and a second open position;

a pivot pin extending through the first and second scissor jaws, wherein the first and second jaws are configured to rotate around the pivot pin as the scissor apparatus actuates between the closed position and the open positions;

a dynamic pin positioned between the first jaw face and the second jaw face, wherein the dynamic pin is configured to push against the first jaw face such that the dynamic pin and the first scissor jaw move to actuate the scissor apparatus into the first open position in response to the control member moving into the first deflection position, and wherein the dynamic pin is configured to push against the second jaw face such that the dynamic pin and the second scissor jaw move to actuate the scissor apparatus into the second open position in response to the control member moving into the second deflection position; and a biasing member positioned at least partially around the scissor apparatus and configured to bias the scissor apparatus toward the closed position.

7. The hand controller of claim 6, wherein a distance between the first and second jaw faces increases as the scissor apparatus actuates from the closed position to the open positions.

8. The hand controller of claim 6, wherein the first scissor jaw comprises a first pivot end defining a first opening, wherein the second scissor jaw comprises a second pivot end defining a second opening, and wherein the pivot pin extends through the first and second openings.

9. The hand controller of claim 8, wherein a circumferential gap is present between the first and second jaw faces when the scissor apparatus is in the closed position, the first open position, and the second open position.

10. The hand controller of claim 6, wherein the dynamic pin is configured to push against the first jaw face in a first direction to actuate the scissor apparatus into the first open position, wherein the dynamic pin is configured to push against the second jaw face in a second direction to actuate the scissor apparatus into the second open position, and wherein the first and second directions oppose one another.

11. The hand controller of claim 6, wherein the scissor assembly further comprises a static pin positioned at least partially between the first jaw face and the second jaw face, wherein the static pin prevents the second scissor jaw from moving as the scissor apparatus actuates into the first open position, and wherein the static pin prevents the first scissor jaw from moving as the scissor apparatus actuates into the second open position.

12. The hand controller of claim 11, wherein the static pin is positioned closer to a middle portion of the scissor apparatus than the dynamic pin.

13. The hand controller of claim 6, wherein the scissor apparatus is substantially circular, and wherein the biasing member extends around an outer perimeter of the scissor apparatus.

14. The hand controller of claim 13, wherein an outer surface of the scissor apparatus defines a groove, and wherein the biasing member is positioned at least partially around the scissor apparatus and at least partially in the groove.

15. The hand controller of claim 14, wherein actuation of the scissor apparatus is converted into a signal to control a target.

16. A hand controller, comprising:

a control member movable in at least one degree of freedom between a neutral position and a plurality of deflection positions including at least a first deflection position and a second deflection position;

a plurality of scissor spring assemblies coupled to the control member, wherein the scissor assemblies include at least a first scissor spring assembly, a second scissor spring assembly, and a third scissor spring assembly, wherein the first scissor spring assembly is configured to actuate in response to the control member moving in a first dimension, wherein the second scissor spring assembly is configured to actuate in response to the control member moving in a second dimension, wherein the third scissor spring assembly is configured to actuate in response to the control member moving in a third dimension, wherein the first, second, and third dimensions are perpendicular to one another, and wherein each of the first, second, and third scissor spring assemblies comprises:

a scissor apparatus comprising a first scissor jaw and a second scissor jaw that are coupled together, wherein the first scissor jaw has a first jaw face, wherein the second scissor jaw has a second jaw face that opposes the first jaw face, wherein the scissor apparatus is configured to actuate between a closed position and a plurality of open positions including at least a first open position and a second open position, and wherein a distance between the first and second jaw faces increases as the scissor apparatus actuates from the closed position to the open positions;

a pivot pin extending through the first and second scissor jaws, wherein the first and second jaws are configured to rotate around the pivot pin as the scissor apparatus actuates between the closed position and the open positions;

a dynamic pin positioned between the first jaw face and the second jaw face, wherein the dynamic pin is configured to push against the first jaw face in a first direction such that the dynamic pin and the first scissor jaw move in the first direction to actuate the scissor apparatus into the first open position in response to the control member moving into the first deflection position, wherein the dynamic pin is configured to push against the second jaw face in a second direction such that the dynamic pin and the second scissor jaw move in the second direction to actuate the scissor apparatus into the second open position in response to the control member moving into the second deflection position, and wherein the first and second directions are arcuate and opposite of one another;

a static pin positioned at least partially between the first jaw face and the second jaw face, wherein the static pin prevents the second scissor jaw from moving as the scissor apparatus actuates into the first open position, and wherein the static pin prevents the first scissor jaw from moving as the scissor apparatus actuates into the second open position; and a biasing member extending around an outer perimeter of the scissor apparatus, wherein the biasing member is configured to provide a bias force that actuates the scissor apparatus into the closed position and moves the control member into the neutral position in response to a user releasing the control member.

17. The hand controller of claim 16, wherein the scissor apparatus has a substantially circular shape when in the closed position, wherein an outer surface of the scissor apparatus defines a groove, and wherein the biasing member is positioned at least partially within the groove.

18. The hand controller of claim 16, further comprising a washer positioned at least partially between the first and second scissor jaws, wherein the pivot pin extends through the washer, wherein the biasing member comprises a spring, and wherein the washer extends at least partially into the groove to prevent the spring from slipping, rotating, or dislodging as the scissor apparatus actuates.

19. The hand controller of claim 18, wherein ends of the spring are coupled together via a coupling mechanism, and wherein the washer is adjacent to or in contact with the coupling mechanism.

20. The hand controller of claim 16, wherein the scissor assemblies are configured to move one or more targets on spacecraft in an environment without gravity.

* * * * *